United States Patent [19]
Eger et al.

[11] Patent Number: 6,156,369
[45] Date of Patent: *Dec. 5, 2000

[54] FOOD SPREADS

[76] Inventors: Shaul Eger, Yokneam, Moshava 20600, Israel; Ishak Neeman, 8 Shderot Halamed Hei, Haifa, Israel

[ * ] Notice: This patent is subject to a terminal disclaimer.

[21] Appl. No.: 09/406,686

[22] Filed: Sep. 27, 1999

Related U.S. Application Data

[63] Continuation-in-part of application No. 09/225,231, Jan. 4, 1999.

[51] Int. Cl.⁷ .................................................. A23D 9/007
[52] U.S. Cl. ............................................ 426/601; 426/607
[58] Field of Search ..................................... 426/602, 607, 426/601

[56] References Cited

U.S. PATENT DOCUMENTS

| | | | |
|---|---|---|---|
| 3,889,011 | 6/1975 | Read | 426/604 |
| 4,229,488 | 10/1980 | Suggs | 426/557 |
| 4,764,392 | 8/1988 | Yasufuku | 426/603 |
| 5,352,475 | 10/1994 | Tholl | 426/603 |
| 5,409,727 | 4/1995 | Tholl | 426/601 |
| 5,470,598 | 11/1995 | Scavone | 426/601 |

FOREIGN PATENT DOCUMENTS

| | | |
|---|---|---|
| 0500152 | 1/1992 | United Kingdom . |
| 2292949 | 3/1996 | United Kingdom . |
| 2293828 | 4/1996 | United Kingdom . |

*Primary Examiner*—Carolyn Paden
*Attorney, Agent, or Firm*—Mark M. Friedman

[57] ABSTRACT

The present invention is of a food spread containing a mixture of at least one edible oil of natural or synthetic origin and a monoglyceride. The oil is preferably one or more of the oils from the group of olive oil, avocado oil, canola oil, soybean oil, sunflower oil, nut oils, walnut oil, peanut oil, safflower oil, cottonseed oil, coconut oil, rice bran oil, mustardseed oil, camelina oil, chia oil, flaxseed oil, perilla oil, fish oil, palm oil, sesame oil, wheatgerm oil, jojoba oil or corn oil. More preferably an oil such as avocado oil, fish oil, palm oil or olive oil is used and most preferably the oil is olive oil and fish oil. The monoglycerides used are preferably derivatives of oleic, or palmitic acid. The oil is present preferably in an amount of from about 85 to about 98 percent and most preferably in an amount of from about 93 to about 96 percent. The more monoglyceride used, the greater the degree of solidity of the food spread at room temperature. It is therefore possible to produce a desired degree of solidity, by changing the proportion of monoglyceride.

32 Claims, No Drawings

FOOD SPREADS

This is a Continuation in Part of U.S. patent application Ser. No. 09/225,231, filed Jan. 4, 1999.

FIELD AND BACKGROUND OF THE INVENTION

The present invention relates to a novel food spread and its production. In particular, it concerns a food spread containing a mixture of at least an edible oil from a natural origin and a monoglyceride.

Food spreads such as margarine and butter are commonplace in the kitchen. They are used in the home and in industry for cooking, baking, sandwiches and numerous food products. In recent years, attention has been directed to producing healthier food spreads, in the form of reduced fat alternatives to the existing products.

Margarines contain a water phase and an oil phase, which are emulsified. They are generally in the form of a water-in-oil emulsion. The taste of margarines and food spreads is due mostly to water soluble flavors, oil soluble flavors and salt included in the water phase. Margarine type compounds contain at least 80% of fat by weight. The fat content is made up mainly of polysaturated fats. In the production of margarine the polysaturated fats are hydrogenated, however the hydrogenated products are very readily acidified to produce free radical carcinogenic compounds.

Butter, margarine and food spreads contain preservatives and need to be refrigerated. They have no known positive health value and their use is therefore generally based on their taste and cooking properties.

The therapeutic properties of oils from natural origins, such as olive oil and avocado oil have been widely documented. Olive oil has been indicated as having a therapeutic effect in stomach ailments (1, 1a), increasing memory (2), decreasing mortality from heart disease due to increasing blood flow (3) and softening skin (4). Additionally, olive oil is used in relieving ear infection, may reduce the risk of certain cancers (5, 6), decreases calcium loss from bones and increases mineral absorption (7). In children, olive oil has been linked to stimulating growth and development (8).

The properties of olive oil result from its chemical structure. Olive oil is made up of 75% oleic acid, a monounsaturated fatty acid, approximately 14% polyunsaturated fatty acids, mainly linoleic acid and about 11% saturated fatty acids. Oleic acid, the main constituent of olive oil is very stable and is therefore less readily acidified to produce carcinogenic free radicals. In contrast, margarine consists of mainly (64%) polysaturated fatty acids and only 30% monounsaturated fatty acids.

Likewise, the properties of avocado oil are a result of its structure. It is made up of 10% 18:2 ω-6 fatty acid, 70% 18:1 ω-9 fatty acid and 20% 18:0 ω-6 fatty acid. As is the case in olive oil, a major component of avocado oil is monounsaturated fatty acid. Avocado oil has a characteristically bitter taste. On distillation of the oil, the taste improves, but the nutrition value decreases.

U.S. Pat. No. 4,226,895, U.S. Pat. No. 4,284,655 and U.S. Pat. No. 5,409,727 disclose food spreads containing an oil in water emulsion. However, in the present invention, water, is not used.

U.S. Pat. No. 5,360,626 discloses an edible food product containing an oil phase thickened with a texturizing agent comprising an alkyl-substituted, non-nitrogen containing oil-soluble polymer having a molecular weight of at least 2000 daltons. The monoglyceride of the present invention is less than 2000 daltons. In addition, a food spread is disclosed containing an aqueous phase and an oil phase. The present invention does not contain an aqueous phase.

U.S. Pat. No. 5,376,398 discloses a fat component useful for preparing a reduced calorie food product, the fat component comprising an edible triglyceride and a polytetramethylene ether glycol esterified with a fatty acid entity. In contrast, the present invention does not contain a polytetramethylene ether glycol.

The background art discloses reduced fat alternatives to margarines and existing food spreads, however, none of these prior art references suggests the production of a food spread containing a mixture of only an edible oil of natural origin, preferably with therapeutic properties and a monoglyceride.

There is thus a widely recognized need for, and it would be highly advantageous to have, a food spread as is described in the present invention.

SUMMARY OF THE INVENTION

The present invention provides a food spread containing a mixture of at least one edible oil of natural origin and a monoglyceride.

According to the teachings of the present invention there is provided in a first embodiment a food spread comprising a mixture of an edible oil and a monoglyceride.

In a preferred embodiment the food spread further comprises a fat soluble flavor.

In a preferred embodiment the oil is selected from the group consisting of olive oil, avocado oil, canola oil, soybean oil, sunflower oil, nut oils, walnut oil, peanut oil, safflower oil, cottonseed oil, coconut oil, rice bran oil, mustardseed oil camelina oil, chia oil, flaxseed oil, perilla oil, palm oil, fish oil, sesame oil, wheatgerm oil, jojoba oil and corn oil and combinations thereof.

In a preferred embodiment the oil is olive oil.

In a preferred embodiment the oil is avocado oil.

In a preferred embodiment the oil is palm oil.

In a preferred embodiment the oil is fish oil.

In a preferred embodiment the monoglyceride is a derivative of oleic acid.

In a preferred embodiment the monoglyceride is a derivative of palmitic acid.

In a preferred embodiment the oil is present in an amount of from about 85 to about 98 percent.

In a preferred embodiment the oil is preferably present in an amount of from about 93 to about 96 percent.

In a preferred embodiment the food spread further comprises an emulsifier.

In a second embodiment the present invention provides a method of producing a food spread comprising the steps of: (a) heating at least one edible oil and at least one monoglyceride to produce a dissolved mixture; (b) mixing said dissolved mixture; and (c) cooling said dissolved mixture to produce a food spread.

In a preferred embodiment the oil is selected from the group consisting of olive oil, avocado oil, canola oil, soybean oil, sunflower oil, nut oils, walnut oil, peanut oil, safflower oil, cottonseed oil, coconut oil, rice bran oil, mustardseed oil camelina oil, chia oil, flaxseed oil, perilla oil, palm oil, fish oil, sesame oil, wheatgerm oil, jojoba oil and corn oil and combinations thereof.

In a preferred embodiment the oil is olive oil.

In a preferred embodiment the oil is avocado oil.

In a preferred embodiment the oil is palm oil.

In a preferred embodiment the oil is fish oil.

In a preferred embodiment the monoglyceride is a derivative of oleic acid.

In a preferred embodiment the monoglyceride is a derivative of palmitic acid.

In a preferred embodiment the oil is present in an amount of from about 85 to about 98 percent.

In a preferred embodiment the oil is present in an amount of from about 93 to about 96 percent.

In a preferred embodiment the step of said heating is performed at a temperature in a range of from about 45° C. to about 75° C.

In a preferred embodiment the step of said heating is performed at a temperature in a range of from about 60° C. to about 75° C.

In a preferred embodiment the step of said heating is performed at a temperature in a range of from about 68° C. to about 70° C.

In a preferred embodiment the method of producing a food spread further comprises the step of adding a fat soluble flavor.

In a preferred embodiment the method of producing a food spread further comprises the step of adding an emulsifier.

In a third embodiment the present invention provides a food spread consisting essentially of an edible oil, a monoglyceride and an emulsifier.

In a preferred embodiment the edible oil is olive oil.

In a preferred embodiment the edible oil is avocado oil.

In a preferred embodiment the edible oil is palm oil.

In a preferred embodiment the edible oil is fish oil.

The term 'natural origin' as used herein refers to all edible vegetable oils and fish oils with the exception of synthetic oils.

The term 'edible oil' as used herein refers to all oils of plant origin, synthetic oils, and fish oils that are fit to be eaten.

The term 'olive oil' as used herein refers to all types of purity of olive oil known to one skilled in the art.

The term 'fish oil' as used herein refers to fish oil comprising all possible concentrations of mixtures of EPA and DHA.

DESCRIPTION OF THE PREFERRED EMBODIMENTS

The present invention is of a food spread containing a mixture of at least one edible oil of natural origin and a monoglyceride. The oil is preferably one or more of the oils from the group of olive oil, avocado oil, canola oil, soybean oil, sunflower oil, nut oils, walnut oil, peanut oil, safflower oil, cottonseed oil, coconut oil, rice bran oil, mustardseed oil, camelina oil, chia oil, flaxseed oil, perilla oil, fish oil, palm oil, sesame oil, wheatgerm oil, jojoba oil or corn oil and combinations thereof. More preferably an oil such as avocado oil, fish oil, palm oil or olive oil is used and most preferably the oil is olive oil and fish oil. In an alternative embodiment, the food spread can optionally contain a mixture of at least one synthetic edible oil or edible oil of natural origin and combinations thereof and a monoglyceride. The monoglycerides used are preferably derivatives of oleic, or palmitic acid. The oil is present preferably in an amount of from about 85 to about 98 percent and most preferably of from about 93 to about 96 percent. The monoglyceride is present preferably in an amount of from about 2% to about 15%, more preferably of from about 4 percent to about 7 percent and most preferably in an amount of about 7 percent. The more monoglyceride used, the greater the degree of solidity of the food spread at room temperature. It is therefore possible to produce a desired degree of solidity, by changing the proportion of monoglyceride.

At room temperature monoglycerides are not soluble in edible oils. The monoglycerides are dissolved in the oil at temperatures of from about 45° C. to about 75° C. and preferably from about 60° C. to about 75° C. and more preferably from about 68° C. to about 70° C. Emulsifiers can optionally be added such as Tween 80 in an amount of about, but not limited to 0.05%. At these temperatures, the monoglycerides dissolve and the olive oil mixture becomes a transparent solution. On cooling to room temperature, the solution is transformed to a food spread.

In the case of oils such as avocado oil where the taste is less distinctive or less appealing, natural fat soluble flavoring can be added.

The commercially available food spreads are mostly manufactured for their taste, rather than for any health benefit. Margarine food spreads are made by hydrogenation of polysaturated acids, which produce compounds that are easily acidified to free radicals resulting in carcinogenic products. Consequently, there is a tremendous need for a healthier food spread alternative, such as is provided in the present invention. The food spread of the present invention is made without hydrogenation of the oil and preferably uses oils that have potential therapeutic properties. In addition the food spread of the present invention is suitable for use by sufferers of lactose intolerance.

The spread of the present invention is particularly advantageous, due to the simplicity of the process of manufacture. Optionally, only 3 simple steps are involved, heating, mixing, and cooling. The process does not involve the more expensive procedures of hydrogenation or high pressure. The effective temperature range of from about 45° C. to about 75° C., preferably from about 60° C. to about 75° C. and more preferably from about 68° C. to about 70° C. is easily achieved. This temperature range is important as at temperatures below, the spread is not produced. It is unexpected that an oil, such as olive oil, which is liquid at room temperature, should become a solid spread with the addition of only a monoglyceride. Due to the simplicity of manufacture and few ingredients of the spread, this process is very economical. The resulting food spread has a shelf life that is dependent on the shelf life of the monoglyceride. The monoglyceride can typically be kept without spoilage for at least about 1 year in the absence of refrigeration.

In addition, the product of the invention not only has a nutritional basis, but preferably also has potential positive therapeutic properties depending on the oil ingredient.

It is to be understood that the invention is not limited in its application to the details of construction and the arrangement of the components set forth in the following description. The invention includes other embodiments and can be practiced or implemented in various ways. Also it is to be understood that the phraseology and terminology employed herein is for the purpose of description only and should not be regarded as limiting.

The present invention may be better understood with reference to the examples and the accompanying description.

EXAMPLE 1

General Method of Food spread Production

The food spread of the present invention contains a mixture of at least one edible oil of natural origin and a monoglyceride. The oil is preferably one or more of the oils from the group of olive oil, avocado oil, canola oil, soybean oil, sunflower oil, nut oils, walnut oil, peanut oil, safflower oil, cottonseed oil, coconut oil, rice bran oil, mustardseed oil, camelina oil, chia oil, flaxseed oil, perilla oil, fish oil, palm oil, sesame oil, wheatgerm oil, jojoba oil or corn oil. More preferably an oil such as avocado oil, fish oil, palm oil or olive oil is used and most preferably the oil is olive oil and fish oil. In an alternative embodiment, the food spread can optionally contain a mixture of at least one synthetic edible oil and/or an edible oil of natural origin and combinations thereof and a monoglyceride. The monoglycerides used are preferably derivatives of oleic, or palmitic acid. Emulsifiers can optionally be added such as Tween 80 in an amount of about, but not limited to 0.05%.

The synthesis of the food spread optionally involves three main steps, heating the mixture to produce a solution, mixing the components of oil and monoglyceride, and cooling the solution to form the food spread.

According to step 1 of the synthesis of the food spread, the monoglyceride and oil are heated. The oil is present preferably in an amount of from about 85 to about 98 percent and most preferably of from about 93 to about 96 percent. The monoglyceride is present preferably in an amount of from about 2% to about 15%, more preferably of from about 4 percent to about 7 percent and most preferably in an amount of about 7 percent. An emulsifier is optionally present in an amount of about 0.05%.

At room temperature monoglycerides are generally not soluble in the oil. The monoglycerides are preferably dissolved in the oil at temperatures of from 45° C. to about 75° C. and preferably from about 60° C. to about 75° C. and more preferably from about 68° C. to about 70° C. At these temperatures, the monoglycerides dissolve and the olive oil mixture becomes a transparent solution.

According to step 2 of the synthesis of the food spread, the monoglyceride, emulsifier and oil are mixed.

In step 3 of the synthesis of the food spread, the solution is preferably cooled to room temperature. On cooling, the solution is transformed to a food spread.

Optionally, additives, such as fat soluble flavorings can be added to produce a food spread with a distinctive taste. This is preferable when the oil, such as avocado oil does not have an attractive taste.

EXAMPLE 2

Monoglyceride (derivative of palmitic acid, 4 g) and extra virgin olive oil (96 g) were heated to 68–70° C. Tween 80 (0.05%) was added and mixed and the mixture subsequently cooled to room temperature to produce the product. The food spread was stable at 4° C., –4° C. and –18° C.

EXAMPLE 3

Monoglyceride (derivative of palmitic acid, 5 g) and extra virgin olive oil (95 g) were heated to 68–70° C. Tween 80 (0.05%) was added and mixed and the mixture subsequently cooled to room temperature to produce the product. The food spread was stable at 4° C., –4° C. and –18° C. and didn't decompose on thawing.

EXAMPLE 4

Monoglyceride (derivative of palmitic acid, 6 g) and extra virgin olive oil (94 g) were heated to 68–70° C. Tween 80 (0.05%) was added and mixed and the mixture subsequently cooled to room temperature to produce the product. The food spread was stable at 4° C., –4° C. and –18° C.

EXAMPLE 5

Monoglyceride (derivative of palmitic acid, 7 g) and extra virgin olive oil (93 g) were heated to 68–70° C. Tween 80 (0.05%) was added and mixed and the mixture subsequently cooled to room temperature to produce the product. The food spread was stable at 4° C., –4° C. and –18° C. and didn't decompose on thawing.

EXAMPLE 6

Monoglyceride (derivative of palmitic acid, 4 g) and distilled avocado oil (96 g) were heated to 68–70° C. Tween 80 (0.05%) was added and mixed and the mixture subsequently cooled to room temperature to produce the product. The food spread was stable at 4° C., –4° C. and –18° C.

EXAMPLE 7

Monoglyceride (derivative of palmitic acid, 5 g) and distilled avocado oil (95 g) were heated to 68–70° C. Tween 80 (0.05%) was added and mixed and the mixture subsequently cooled to room temperature to produce the product. The food spread was stable at 4° C., –4° C. and –18° C.

EXAMPLE 8

Monoglyceride (derivative of palmitic acid, 6 g) and distilled avocado oil (94 g) were heated to 68–70° C. Tween 80 (0.05%) was added and mixed and the mixture subsequently cooled to room temperature to produce the product. The food spread was stable at 4° C., –4° C. and –18° C.

EXAMPLE 9

Monoglyceride (derivative of palmitic acid, 7 g) and distilled avocado oil (93 g) were heated to 68–70° C. Tween 80 (0.05%) was added and mixed and the mixture subsequently cooled to room temperature to produce the product. The food spread was stable at 4° C., –4° C. and –18° C.

EXAMPLE 10

Monoglyceride (derivative of palmitic acid, 6 g) and distilled palm oil (94 g) were heated to 68–70° C. Tween 80 (0.05%) was added and mixed and the mixture subsequently cooled to room temperature to produce the product. The food spread was stable at 4° C., –4° C. and –18° C.

EXAMPLE 11

Monoglyceride (derivative of palmitic acid, 7 g) and distilled palm oil (93 g) were heated to 68–70° C. Tween 80 (0.05%) was added and mixed and the mixture subsequently cooled to room temperature to produce the product. The food spread was stable at 4° C., –4° C. and –18° C.

EXAMPLE 12

Monoglyceride (derivative of palmitic acid, 6 g) and distilled fish oil (94 g) containing EPA (180 mg/g) and DHA (120 mg/g) were heated to 68–70° C. Tween 80 (0.05%) was added and mixed and the mixture subsequently cooled to room temperature to produce the product. The food spread was stable at 4° C., –4° C. and –18° C.

EXAMPLE 13

Monoglyceride (derivative of palmitic acid, 7 g) and distilled fish oil (93 g) containing EPA (180 mg/g) and DHA (120 mg/g) were heated to 68–70° C. Tween 80 (0.05%) was added and mixed and the mixture subsequently cooled to room temperature to produce the product. The food spread was stable at 4° C., –4° C. and –18° C.

EXAMPLE 14

Monoglyceride (derivative of palmitic acid, 6 g) and distilled fish oil (94 g) containing EPA (360 mg/g) and DHA (240 mg/g) were heated to 68–70° C. Tween 80 (0.05%) was added and mixed and the mixture subsequently cooled to room temperature to produce the product. The food spread was stable at 4° C., –4° C. and –18° C.

EXAMPLE 15

Monoglyceride (derivative of palmitic acid, 7 g) and distilled fish oil (93 g) containing EPA (360 mg/g) and DHA (240 mg/g) were heated to 68–70° C. Tween 80 (0.05%) was added and mixed and the mixture subsequently cooled to room temperature to produce the product. The food spread was stable at 4° C., –4° C. and –18° C.

The spread of the present invention contains a mixture of at least one edible oil of natural origin and a monoglyceride. Preferably, the oil is an oil with potential therapeutic properties. In this way, the resulting food spread may have health benefits to the ingester. More preferably, the oil used is olive oil, fish oil, palm oil or avocado oil.

Olive oil and fish oil have been documented as having a therapeutic effect in many conditions including heart disease. Without wishing to be limited by a single hypothesis, olive oil and fish oil's properties are a result of their chemical composition. The food spread of the present invention combines the potential therapeutic properties and the taste of olive oil and fish oil to produce a healthy alternative to available food spreads. Furthermore, the food spread does not need refrigeration.

It will be appreciated that the above examples and descriptions are intended only to serve as examples, and that many other embodiments are possible within the spirit and the scope of the present invention.

REFERENCES CITED

1. Taits, N.S. Use of olive oil in the treatment of ulcer patients. Urach. Delo. 7, 67, 1966.
1a. Ricci, G. (1969) L'olio di oliva in gastroenterologia. In: $1^{st}$ International Congress on the biological value of olive oil. Lacca (Italy) 10–12 Oct. p.128.
2. Harman, D. (1980). Free radical theory of Aging: Effect of fat on lipid composition and function of the brain. In: $3^{rd}$ Int. Cong. On the biological value of olive oil. Canin, Creta. P.190.
3. Berry, M.E. et al. 1992. Effects of diets rich in monounsaturated fatty acids on plasma lipoproteins -The Jerusalem Study. II Monounsaturated fatty acids vs. Carbohydrates. Am. J. Clin. Nat. (1992) 56, 394–403.
4. Pinckney, E.R. et al (1973). The potential toxicity of excessive polyunsaturates. Do not let the patient harm himself. Am. Heart J. 85, 723, 1973.
5. Trichopoula, A. et al. (1995) Consumption of olive oil and specific food groups in relation to breast cancer risk in Greece. J. of the National Cancer Institute 87, No. 2.
6. Bitterman, W.A. et al. (1991) Environmental and nutritional factors significantly associated with cancer of the urinary tract among different ethnic groups. Urologic. Clinics of North America Vol. 18 No. 3.
7. Laval-Jeanet, A.M. et al. (1980) Effets des lipides oleiques sur la croissance et la composition de l'os en nutrition experimentale. In: $3^{rd}$ International Congress on the biological value of olive oil. Conea Crete p.309.
8. Crawford, M.A. (1975) The role of essential fats in human maternal and infant nutrition with special reference to brain growth. In: $2^{nd}$ Int. Cong. On the biology value of olive oil. Toremolinos p.35.

What is claimed is:

1. A food spread comprising a non-aqueous mixture of an edible oil and a monoglyceride in an amount of from about 85% to about 98% edible oil and from about 2% to about 15% monoglyceride, the food spread being formed by a method comprising the steps of:
   (a) firstly heating to a temperature of from about 45° C. to about 75° C. at least one edible oil in an amount of from about 85% to about 98% and at least one monoglyceride in an amount of from about 2% to about 15% monoglyceride to produce a dissolved mixture;
   (b) subsequently mixing said dissolved mixture; and
   (c) then cooling said dissolved mixture to room temperature, to form a food spread for human consumption, said food spread being stable at temperatures of from about room temperature to about –18° C.
2. The food spread of claim 1, further comprising a fat soluble flavor.
3. The food spread of claim 1, wherein said oil is selected from the group consisting of olive oil, avocado oil, canola oil, soybean oil, sunflower oil, nut oils, walnut oil, peanut oil, safflower oil, cottonseed oil, coconut oil, rice bran oil, mustardseed oil camelina oil, chia oil, flaxseed oil, perilla oil, palm oil, fish oil, sesame oil, wheatgerm oil, jojoba oil and corn oil and combinations thereof.
4. The food spread of claim 1, wherein said oil is olive oil.
5. The food spread of claim 1, wherein said oil is avocado oil.
6. The food spread of claim 1, wherein said oil is palm oil.
7. The food spread of claim 1, wherein said oil is fish oil.
8. The food spread of claim 1, wherein said monoglyceride is a derivative of oleic acid.
9. The food spread of claim 1, wherein said monoglyceride is a derivative of palmitic acid.
10. The food spread of claim 1, wherein said oil is present in an amount of from about 85 to about 98 percent.
11. The food spread of claim 1, wherein said oil is preferably present in an amount of from about 93 to about 96 percent.
12. The food spread of claim 1, further comprising an emulsifier.
13. A method of producing a non-aqueous food spread comprising the steps of:
   (a) firstly heating to a temperature of from about 45° C. to about 75° C. at least one edible oil in an amount of from about 85% to about 98%, and at least one monoglyceride in an amount of from about 2% to about 15% to produce a dissolved mixture;
   (b) subsequently mixing said dissolved mixture; and
   (c) then cooling said dissolved mixture to room temperature, to produce a food spread for human consumption, said food spread being stable at temperatures of from about room temperature to about –18° C.
14. The method of claim 13, wherein said oil is selected from the group consisting of olive oil, avocado oil, canola oil, soybean oil, sunflower oil, nut oils, walnut oil, peanut oil, safflower oil, cottonseed oil, coconut oil, rice bran oil, mustardseed oil camelina oil, chia oil, flaxseed oil, perilla oil, palm oil, fish oil, sesame oil, wheatgerm oil, jojoba oil and corn oil and combinations thereof.

15. The method of claim 13, wherein said oil is olive oil.

16. The method of claim 13, wherein said oil is avocado oil.

17. The method of claim 13, wherein said oil is palm oil.

18. The method of claim 13, wherein said oil is fish oil.

19. The method of claim 13, wherein said monoglyceride is a derivative of oleic acid.

20. The method of claim 13, wherein said monoglyceride is a derivative of palmitic acid.

21. The method of claim 13, wherein said oil is present in an amount of from about 85 to about 98 percent.

22. The method of claim 13, wherein said oil is present in an amount of from about 93 to about 96 percent.

23. The method of claim 13, wherein the step of said heating is performed at a temperature in a range of from about 45° C. to about 75° C.

24. The method of claim 13, wherein the step of said heating is performed at a temperature in a range of from about 60° C. to about 75° C.

25. The method of claim 13, wherein the step of said heating is performed at a temperature in a range of from about 68° C. to about 70° C.

26. The method of claim 13, further comprising the step of adding a fat soluble flavor.

27. The method of claim 13, further comprising the step of adding an emulsifier.

28. A food spread consisting essentially of a non-aqueous mixture of an edible oil, a monoglyceride and an emulsifier, in an amount of from about 85% to about 98% edible oil and from about 2% to about 15% monoglyceride and 0.05% emulsifier, the food spread being formed by a method comprising the steps of:

(a) firstly heating to a temperature of from about 45° C. to about 75° C. at least one edible oil in an amount of from about 85% to about 98% and at least one monoglyceride in an amount of from about 2% to about 15% monoglyceride and at least one emulsifier to produce a dissolved mixture;

(b) subsequently mixing said dissolved mixture; and (c) then cooling said dissolved mixture to room temperature, to form a food spread for human consumption, said food spread being stable at temperatures of from about room temperature to about −18° C.

29. The food spread of claim 28, wherein said edible oil is olive oil.

30. The food spread of claim 28, wherein said edible oil is avocado oil.

31. The food spread of claim 28, wherein said edible oil is palm oil.

32. The food spread of claim 28, wherein said edible oil is fish oil.

* * * * *